Patented Dec. 30, 1930

1,787,124

UNITED STATES PATENT OFFICE

HANS SIEGENS, OF HORREM, NEAR COLOGNE, GERMANY

METHOD FOR MAKING PURE ALUMINA BY ELECTROTHERMAL REDUCTION OF THE IMPURITIES IN ALUMINA-CONTAINING RAW MATERIALS

No Drawing. Application filed December 22, 1927, Serial No. 242,001, and in Germany June 1, 1926.

I have filed applications in Germany June 1. 1926, and January 14, 1927.

This invention relates to a method for making pure alumina by electrothermal reduction of the impurities in alumina-containing raw materials.

It is known in the manufacture of alumina from bauxite, clay and the like, that the removal of the last residues of impurities by electrothermal reduction entails considerable difficulties and that an excess of carbon has always to be present for carrying through the reduction. An alumina having the degree of purity necessary for the manufacture of aluminium is however very seldom obtained and this only when certain special working conditions are adhered to.

Thus it has been found, that the moment of adding the excess of reducing agent or in other words the distribution of reducing agent in the reaction mixture is of considerable influence upon the course of the process. One therefore generally distributed the whole amount of reducing agent preferably carbon comparatively uniformly over the whole charge of the raw material. Then the reaction mixture always contained an excess of carbon during the entire course of the process and a comparatively pure product, the composition of which was not changed by further addition of raw material, was produced from the beginning to the end of the process. This known method has however the disadvantage, that the pure material, present during nearly the whole time of charging, is because of its high melting point easily cooled too much by too quick charging and thereby solidified, thus causing troubles, which cannot be remedied by slow charging of further raw material with an excess of carbon. In order to avoid this disadvantage it has therefore been proposed to charge the furnace with a reaction mixture containing less carbon than is necessary for the reduction. The melt thus obtained has a lower melting point, does not solidify so easily and is more mobile, which is an advantage for carrying through the process. In order to obtain a completely pure product an excess of carbon without further raw material is added to the reaction mixture just at the end of the process. This method has however also great disadvantages. The pure carbon added to the reaction mixture at the end of the process does not enter deep into the melt; it remains at the surface of the melt and causes by its great concentration and bad distribution a reduction of a part of alumina to aluminum and aluminum carbide. The aluminum at the surface evaporates easily and is oxidized in the oxygen containing atmosphere above the surface of the melt, thereby producing a heat, which makes it nearly impossible to work in the vicinity of the furnace. The formation of much aluminum carbide is also noxious, as aluminum carbide makes the melt more viscous, forms a doughy mass with the metals obtained by the reduction and makes it difficult to tap the iron silicide.

The disadvantages of the above described known methods are avoided by the present invention, which includes the following steps:

1. The furnace is first charged with an alumina-containing raw material, preferably briquetted and containing no carbon or less than is necessary for the reduction of the impurities.

2. The theoretical amount of carbon necessary for the reduction of the impurities is reached during the course of the reaction by increasing the amount of carbon in the mixture of alumina-containing raw material and carbon used for charging the furnace.

3. The excess of carbon in the melt necessary for the practical execution of the process is obtained later in the charging period. For example, when the last third of the period necessary for the reduction begins, by adding a raw material containing admixtures of the requisite amounts of carbon.

When adhering to these working conditions the melt is mobile during a large part of the reaction period and the increased amounts of carbon charged together with the raw material are uniformly distributed in the melt, thereby avoiding the disadvantages of local carbon accumulations, the sudden evaporation of great amounts of aluminum, the production of an excessive heat in the vicinity of the furnace and the production of great amounts of aluminum carbide. The carbon added to the melt admixed with alumina-containing raw material is pulled down into the liquid melt by the raw material; this is especially the case, when disintegrated raw material is mixed with disintegrated carbon and this mixture added to the melt in form of briquettes.

It was further observed, that after the melting down of a mixture of bauxite and an excess of carbon in an electric furnace the degree of purity of the alumina on the upper part of the furnace is highest in a certain relatively short period of the process, after which it becomes lower again comparatively quickly. Researches have shown, that this contamination of the alumina layer is due to the following fact. The titanium-containing iron silicide at the bottom of the furnace is constantly whirled up. The metals, which are the reduced impurities, thus come to the surface of the melt, where they are oxidized and dissolved again in the liquid alumina, if there is not always a reducing or neutral atmosphere above the surface of the melt. This contamination of the purified alumina can be avoided by several steps, which all have the common feature, that a reducing or neutral atmosphere above the melt is kept if possible during the whole time but at least towards the end of the process.

The most simple form of executing this method consists in that the charge of the furnace is tapped at a time when the excess of carbon is not yet consumed. One obtains then an alumina still containing some free carbon; this free carbon has however no noxious influence, when using the alumina for making aluminum by electrolysis. To find the right moment for tapping the alumina it has been found advisable to take samples of the melt with an iron bar dipped for a short time into the melt. The alumina coats the bar with an incrustation, the appearance of which may be used for the determination of the degree of purity of the melt. Thus for example the melt has to be drawn off when the colour of the sample is light gray, that is before the melt begins to become white. The melt then contains still such an amount of carbon, that the carbon monoxide developed keeps away the air from the surface of the melt or the oxidizable metals are reduced again by the carbon in the melt.

When working under the described conditions good results are only obtained, when the raw material and the carbon are added to the furnace in a finely distributed and thoroughly mixed state. This is due to the fact that solid depositions of the raw material charge on the walls of the furnace crucible cannot be avoided. In the further course of the process, that is, during the finishing of the heating, this raw material is melted away again from the wall of the crucible. When the components of the raw material are not finely ground and thoroughly mixed the carbon and the bauxite are not always dissolved in the right proportions and the appearance of the drawn sample is therefore deceptively changed during the finishing melting process. When the distribution of the carbon is not uniform the generation of carbon monoxide does not take place over the whole surface of the melt and there are places where the oxygen of the air may touch the surface of the melt, and have a noxious influence upon those parts of the melt. The good distribution and mixture of the alumina-containing raw material with the carbon is best obtained by disintegrating and briquetting the components of the charge.

Another method for obtaining the desired effect consists in carrying through the process in a covered furnace, thereby avoiding the access of air to the surface of the melt. Also in this case it is advisable to let a neutral or reducing gas pass along the surface of the melt during the whole process.

The gradual increase of the added carbon according to the invention has however also a disadvantage. As long as the amount of carbon is not sufficient for the reduction of all the impurities, mainly iron is precipitated; with the increasing amount of carbon, silicon, and at the end of the process, titanium is precipitated. The first precipitated heavy iron deposits at the bottom of the furnace in the very liquid melt which exists at the beginning, whereas the lighter metals, reduced later, only difficultly sink to the bottom in the more viscous later melt and are only partially alloyed with the iron. These metals are partially suspended in the alumina, partially deposited above the lower and heavier layer of iron silicide and tend to enter the layer of alumina, when the melt is whirled. When tapping the alumina the upper layer of impurities, poor in iron, is dragged along by the alumina and finely distributed in the alumina. As the removal of these impurities, poor in iron, by magnetic means is impossible, the alumina thus contaminated cannot be used for the electrical manufacture of aluminum.

I have found, that these disadvantages can be avoided by adding magnetic heavy metals or their compounds, as free as possible from silicon and titanium, together with reducing agent to the melt at or after the end of the charging process.

The addition of a magnetic heavy metal or better of one of its compounds, which are uniformly dissolved in the melt of alumina and reduced to metal by the added reducing agents, causes a fine metal shower in the melt. The shower pulls the lighter metals, suspended in the melt, down to the bottom of the crucible and combines with these light metals to an alloy which is magnetic and may be easily separated from the alumina later.

Of special advantage is the addition of iron-containing alumina obtained when making synthetic bauxite from clay or the like, for example by treating the clay with acid such as hydrochloric acid, evaporating the solution after separation of the insoluble silicate and converting the salts obtained into oxides by calcining them. The obtained product is poor in silicon and titanium and contains the iron in the fine distribution necessary for the purpose in question. At the same time this artificial bauxite is a good alumina-containing raw material for making alumina by electrothermic methods.

It has been found, to be of advantage, when at the end of the purification process of one charge, only the alumina is tapped and the aluminum-containing iron silicide is left in the furnace, in order to be used for a pre-reduction of the impurities of the new charge. This pre-reduction takes place when charging in the beginning of the heating process for the new charge an alumina-containing raw material containing no or little carbon and by tapping the iron silicide, rich in iron but poor in titanium and aluminum, before the amount of carbon necessary for the reduction is added. The iron silicide poor in silicon and titanium obtained by the pre-reduction is preferably used as iron-containing material to be charged at the end of the process in the sense of this invention as indicated above.

I claim:

1. A method for making pure alumina by electrothermal reduction of the impurities in alumina-containing raw materials comprising the steps of charging the furnace at the beginning of the process with a raw material containing less carbon admixed than is necessary for the reduction of the impurities, then charging with mixtures of raw material and carbon containing increasing amounts of carbon, until the theoretical amount of carbon in the reaction mixture is reached, finishing the charging process with mixtures of raw material and carbon in such amounts that an excess of carbon is present in the reaction mixture, and tapping the liquid pure alumina at a moment when still such an amount of free carbon is present in the melt that a sample drawn is still light gray but not white and carbon monoxide is developed by the melt, thereby producing during the last period of the heating process a non-oxidizing atmosphere directly above the surface of the melt.

2. A method according to claim 1, in which briquetted mixtures of finely divided raw material and carbon are used for charging.

3. A method for making pure alumina by electrothermal reduction of the impurities in alumina-containing raw materials, comprising the steps of charging a covered furnace in the beginning of the process with a raw material containing less carbon admixed than is necessary for the reduction of the impurities, then charging mixtures of raw material and carbon containing increasing amounts of carbon until the theoretical amount of carbon in the reaction mixture is reached, and finishing the charging process with mixtures of raw material and carbon in such amounts that an excess of carbon is present in the reaction mixture.

4. A method for making pure alumina by electrothermal reduction of the impurities in alumina-containing raw materials, comprising the steps of charging the furnace in the beginning of the process with a raw material containing less carbon admixed than is necessary for the reduction of the impurities, then charging mixtures of raw material and carbon containing increasing amounts of carbon until the theoretical amount of carbon in the reaction mixture is reached, finishing the charging process with mixtures of raw material and carbon in such amounts, that an excess of carbon is present in the reaction mixture, and passing during the heating process a non-oxidizing gas over the surface of the melt.

5. A method for making pure alumina by electrothermal reduction of the impurities in alumina-containing raw materials, comprising the steps of charging the furnace in the beginning of the process with a raw material containing less carbon admixed than is necessary for the reduction of the impurities, then charging with mixtures of raw material and carbon containing increasing amounts of carbon until the theoretical amount of carbon in the reaction mixture is reached, finishing the charging process with mixtures of raw material and carbon in such amounts that an excess of carbon is present in the reaction mixture, adding at the end of the charging process substances containing a heavy metal but poor in silicon and titanium to the melt, and tapping the liquid pure alumina at a moment when still such an amount of free carbon is present in the melt that a sample drawn is still light gray but not white and carbon monoxide is developed by the melt.

6. A method according to claim 5, in which the substances containing a heavy metal are added in admixture with carbon.

7. A method according to claim 5, in which iron-containing substances are added at the end of the charging process.

8. A process for making pure alumina by electrothermal reduction of the impurities in alumina-containing raw materials, comprising the steps of fusing a mixture of alumina-containing raw material and an amount of carbon insufficient to reduce the impurities in said material, adding thereto mixtures of the raw material and carbon, said mixtures containing an increasing amount of carbon until an excess of carbon is contained in the fusion mixture, adding to said fusion mixture the iron silicide resulting from the fusion of the raw materials containing a small amount of carbon, and tapping the liquid pure alumina at a moment when still such an amount of free carbon is present in the melt that a sample drawn is still light gray but not white and carbon monoxide is developed by the melt.

In testimony whereof I affix my signature.

DR. HANS SIEGENS.